UNITED STATES PATENT OFFICE.

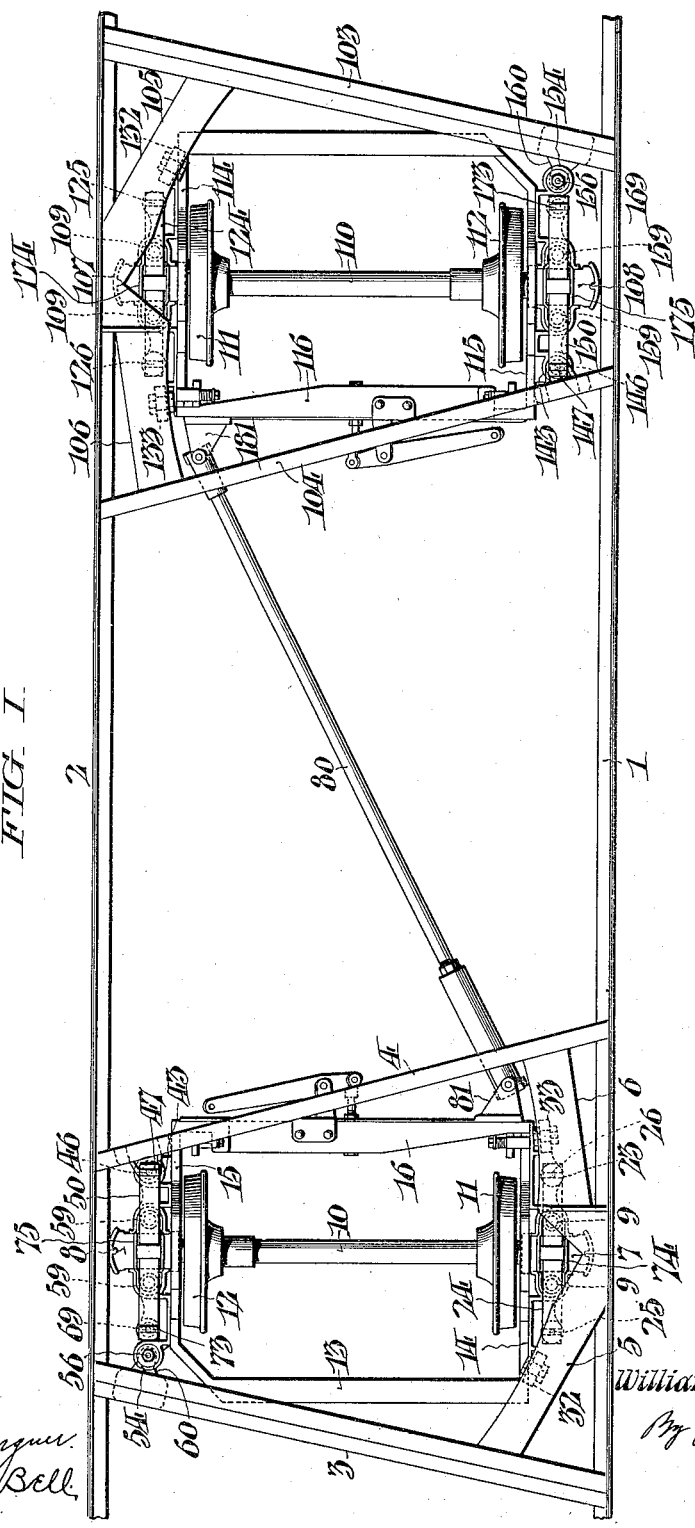

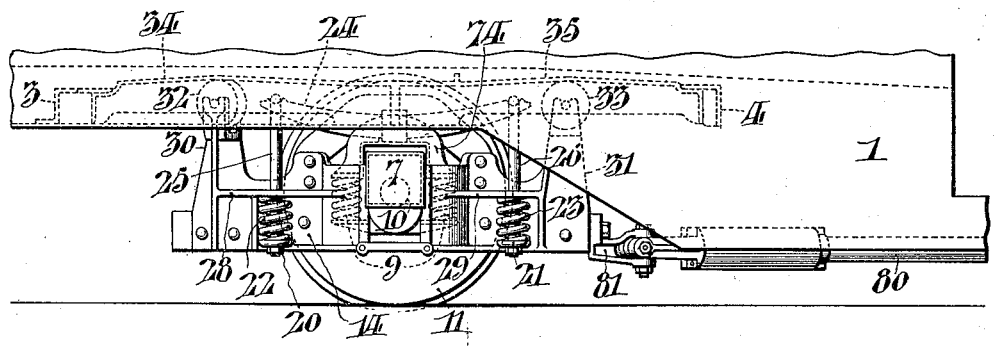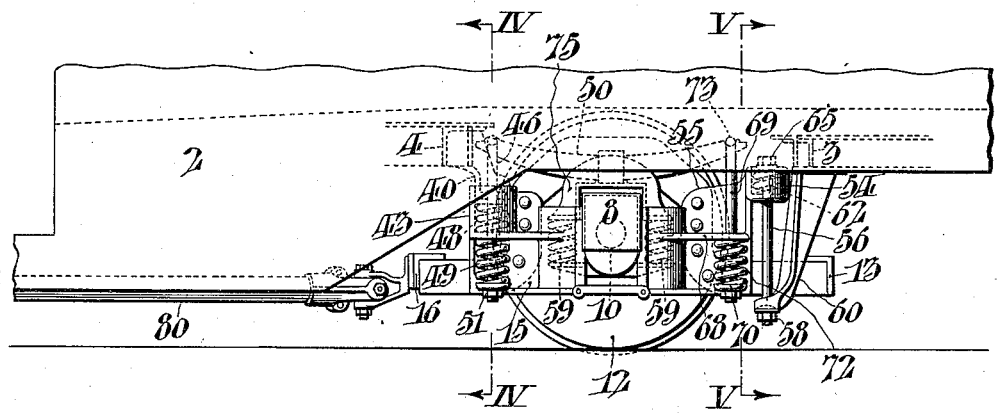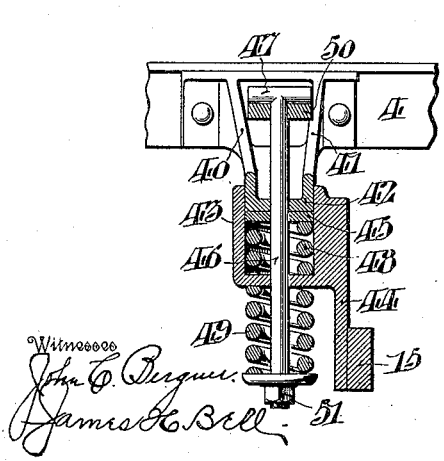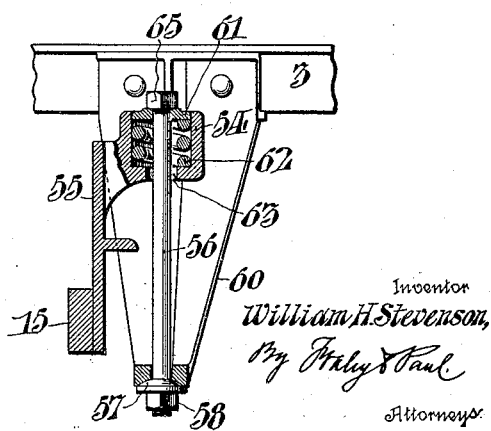

WILLIAM H. STEVENSON, OF PHILADELPHIA, PENNSYLVANIA, ASSIGNOR TO PHILADELPHIA HOLDING COMPANY, OF PHILADELPHIA, PENNSYLVANIA, A CORPORATION OF DELAWARE.

CAR-TRUCK.

1,149,415.     Specification of Letters Patent.     Patented Aug. 10, 1915.

Application filed May 10, 1915. Serial No. 26,977.

*To all whom it may concern:*

Be it known that I, WILLIAM H. STEVENSON, of Philadelphia, in the county of Philadelphia and State of Pennsylvania, have invented certain new and useful Improvements in Car-Trucks, whereof the following is a specification, reference being had to the accompanying drawings.

My invention relates to a truck system of the type which is set forth in Letters Patent of the United States No. 1,091,431, dated March 24th, 1914, further instances thereof being set forth in Letters Patent of the United States No. 1,106,331, dated August 4th, 1914, and No. 1,106,339, dated August 4th, 1914. The general organization thus typified may conveniently be referred to as an oppositely-pivoted and diagonally-correlated truck system.

The present invention relates to a truck of this general character, but having certain specific features set forth in my application for Letters Patent of the United States filed April 7th, 1915, Serial Number 19,694.

Primarily, the present improvements are addressed to an organization whereby a car truck having the specific features described in my said application, may be directly combined with members of the car-body structure, without the intervention of any housing or other adjunct. Certain features also lend themselves to a wider range of embodiment.

In order to avoid ambiguity, I will state that in the present specification, I employ the term "truck" as comprehending the structure which immediately carries an axle and pair of wheels; I employ the term "median plane of the wheels," to indicate an imaginary plane perpendicular to the axis of the axle and intersecting it midway between the wheels, and I employ the expression "fore-and-aft" to indicate the horizontal direction in which said plane extends.

With this preface I would also state that the present invention relates to a structure comprising a pair of trucks, each of which carries only a single axle and pair of wheels, which I will accordingly designate as a single-axle truck. The said trucks are counterparts of one another, but with the several elements reversed in position, that is to say, the parts which are at the right hand side of one are located at the left hand side of the other.

In the accompanying drawings, Figure I, represents a top or plan view of an organization comprising two single-axle trucks, and embodying my invention, said trucks being represented as combined with the longitudinal sill-pieces of the car-body structure, through the medium of peculiarly disposed transverse sill-pieces. Fig. II, is a view in exterior side elevation, of the truck which is at the left hand end of the structure in Fig. I, as seen from the side nearest the observer in said Fig. I. Fig. III, is a view, in exterior side elevation, of the said truck, as seen from the side opposite to the observer in Fig. I, or, (excepting in so far as the reference numerals are concerned), is a view in exterior side elevation of the truck at the right hand end of Fig. I, as seen from the side nearest the observer in said Fig. I. Figs. IV, and V, are partial sectional views, on an enlarged scale, on the lines indicated respectively at IV, IV, and V, V, in Fig. III.

Since the trucks are counterparts of one another, the lateral positions of their respective pivotal points and free points of support being merely reversed, it will only be necessary to describe in detail one of said trucks, similar figures of reference, raised by one hundred, being employed to indicate the corresponding parts of the other truck; thus the axle in the truck which is nearest the left hand end of Fig. I, and which is there numbered 10, is numbered 110, in the truck nearest the right hand end of Fig. I, and so on throughout the numeration of the several parts. The car-body itself is not shown in said figures, but it will be understood that it is directly superimposed upon, and is therefore structurally integral with the longitudinal sill-pieces 1, and 2, and transverse sill-pieces 3, 4, 103, and 104. Said transverse sill-pieces, instead of being arranged at right angles to the longitudinal ones, are convergingly disposed, as shown, the direction of their convergence at one extremity of the car, being opposite to that at the other.

Referring now to the truck which is at the left hand end of Fig. I, the axle 10, carries the wheels 11, and 12, and is provided with journaled boxes 7, and 8, which are spring-mounted with relation to the truck by means of a peculiar system of springs, especially adapted to the conditions characteristic of this type of truck. The truck is approximately rectangular in shape and comprises the end pieces 13, and 16, and side pieces 14, and 15, respectively. The journal boxes carry the coiled springs 9, and 59, respectively (shown in dotted lines), whose upper ends engage beneath the extremities of the saddles 74, and 75. These saddles in turn carry elliptic springs 24, and 50, respectively. The side piece 14, is provided with externally projecting horizontal flanges 28, and 29, which are perforated to permit the passage of the vertical links 25, and 26, whose upper ends are seated in the respective ends of the elliptical spring 24, mounted upon the journal box 7. The lower portions of said links 25, and 26, are surrounded by coil springs 22, and 23, respectively, whose upper ends are seated against the under sides of the flanges 28, and 29, and whose lower ends are seated against flanged nuts 20, and 21, respectively, thereby affording a compound spring-support between the truck and the journal box at that side. The side piece 14, of the truck is provided with upright bearing-standards 30, and 31, carrying the rollers 32, and 33, which respectively coöperate with the double inclined overhead tracks 34, and 35, shown in dotted lines in Fig. II, said tracks are formed on, or secured to, the under sides of the pieces 5, and 6, which are carried by the longitudinal sill-piece 1, and by the transverse sill-pieces 4, the relatively wide divergence of the ends of the sill-pieces, at that side of the car, affording the proper space for the arrangement of said pieces 5, and 6. At the opposite side of the car structure, the truck is mounted upon a definite pivotal axis, situated at a substantial distance from the median plane of the car wheels, and also located at a substantial distance, in a fore-and-aft direction, from the axle, in accordance with the principle of construction set forth in my said pending application, the details of the pivotal mounting, embodying my present invention, being as follows: The cross sill-piece 4, carries a downwardly depending bracket-piece comprising two arms 40, and 41, which are inclined laterally with relation to the face of said sill-piece, said arms uniting at their lower extremities, to form a vertical cylindrical hollow post 42, having an opening in its bottom to permit the passage of a vertical link 46. Said post fits snugly within a cylindrical socket 43, projecting laterally from the vertical bracket 44, mounted upon the side piece 15, of the truck, and the two elements constitute a pivotal connection admitting of some vertical play. The link 46, extends down through an opening in the bottom of said socket piece and is provided at its lower end with a flanged nut 51. The upper end of said link is provided with a transverse piece 47, which is seated in one extremity of the elliptical spring 50, mounted upon the journal box 8. The lower portion of said link is surrounded by two coil springs, one of which 48, is seated within the cavity of the socket piece 43, and bears, at its upper end, against the washer 45, interposed between it and the bottom of the pivot post 42. A second spring 49, engages between the flanged nut 51, and the exterior surface of the bottom of the socket piece 43. A limited vertical play of the link with relation to the pivot post and its socket is therefore permitted, said play being spring-resisted in either direction, and the downward vertical play of the pivot post 42, with relation to the socket piece 43, is also spring-resisted.

The truck is provided at its pivoted side with a free connection and support, intervening between it and the car-body, and situated on the side of the axle, which, in a fore-and-aft direction is opposite to the pivot. Said support comprises the bracket 55, whose upright portion projects vertically from the side piece 15, and has a laterally projecting socket piece 54, in the bottom of which an opening 63, is formed to receive and afford swinging play of a link 56, whose lower end is provided with the lens-shaped bearing-piece 57, adjustably secured by means of a nut 58, and coöperating with a correspondingly shaped socket formed at the lower extremity of the downwardly depending arm 60, which is secured to the face of the transverse sill-piece 3. The upper extremity of the link 56, is provided with a nut 65, and washer 61, which rests upon the upper end of a coil spring 62, seated within the socket piece 54. The convergence of the transverse sill-pieces 3, and 4, at this side of the car affords the proper vertical relation to the truck frame, for the desired location of the pivot, and the swinging link support. The truck frame upon this side is also provided with an external lateral flange 68, perforated to receive the vertical link 69, whose lower end is provided with a flanged nut 70, which engages the lower extremity of the coil spring 72, whose upper extremity is seated against the under side of the flange 68. The upper end of the link 69, is provided with a transverse piece 73, which is seated in the extremity of the elliptical spring 50, opposite to that which carries the link 46, above described.

It will be understood that the truck shown at the right hand end of Fig. I, is (except for the reversal of positions of the parts), constructed in all respects similarly to that just described, and is also combined with the car-body by means of parts which correspond to those just described. The two trucks are connected together by means of a diagonal link 80, which is pivotally attached at 81, and 181, to the end pieces 16, and 116, of the respective trucks. The details of this diagonal connecting link need not be further set forth, it being sufficient to state that by means of it, the swinging movements of the trucks upon their respective pivotal axes are definitely correlated.

From the foregoing description it will be seen that so far as concerns the trucks themselves and the general principle of their pivotal and free supports, the organization comprises the subject matter which is set forth and claimed in my said pending application. The present claims therefore are addressed to the remaining features of improvement, and in order to avoid prolixity I prefer to summarize the characteristic features of the peculiar organization. Thus, I employ the expression "oppositely-pivoted and diagonally-correlated truck system" to means specifically a system which includes two trucks, each having a vertical pivot, located at a substantial distance from the median plane of the wheels, the respective pivotal points being on opposite sides of said plane, and the free or non-pivoted sides of the trucks being connected by means of a diagonal link. The specific features of the present improvement will be claimed as a combination limited to embodiment in the organization thus described.

Having thus described my invention, I claim:

1. In an oppositely-pivoted and diagonally-correlated truck system, having pivots located at substantial distances from the axles in a fore-and-aft direction; the combination, of a pair of longitudinal sill-pieces directly comprised in the car-body structure; transverse sill-pieces arranged in pairs near the respective extremities of said longitudinal sill-pieces, and converging toward the pivoted side of the truck; a pair of single-axle trucks; supporting connections for each truck comprising a downwardly-depending bracket mounted upon one of said transverse sill-pieces and having a pivot post at its lower extremity, a socketed bracket carried by the truck and adapted to snugly receive said pivot post; a downwardly-depending bracket arm carried by the other transverse sill-piece of that pair; a socketed bracket carried by the truck in vertical relation to the lower end of said bracket arm; a spring-supported swinging link engaging said socket bracket at the lower end of said arm; a pair of bearing standards mounted upon the other side of the truck; rollers carried by said standards; and double-inclined tracks mounted in operative relation to said rollers, said tracks being supported upon said longitudinal sill-piece and said transverse sill-pieces near the diverging extremities thereof, substantially as set forth.

2. In an oppositely-pivoted and diagonally-correlated single-axle truck system, having pivots located at a substantial distance from the axle in a fore-and-aft direction, and provided with a swinging link connected at the pivoted side of each truck, and with roller and track supports, at the non-pivoted side of each truck, the combination, with the respective journal boxes, of elliptical springs carried thereby, a vertical link co-axial with the pivot, and connecting the truck with one extremity of the elliptical spring situated at the pivoted side of the truck; a second vertical link connecting the truck with the other extremity of said elliptical spring; and a pair of vertical links connecting the truck with the respective extremities of the elliptical spring carried by the journal box at the non-pivoted side of the truck, said pair of links being arranged on opposite sides of the axle in a fore-and-aft direction.

3. In an oppositely-pivoted and diagonally correlated single-axle truck system, having pivots located at a substantial distance from the axle in a fore-and-aft direction, and provided with a swinging link connected at the pivoted side of each truck, and with roller and track supports, at the non-pivoted side of each truck; the combination, with the respective journal boxes, of elliptical springs carried thereby; a bracket having a socket; a pivot post mounted in said socket; a vertical link co-axial with the pivot, and connecting the truck with one extremity of the elliptical spring situated at the pivoted side of the truck; a coil spring seated within said socket; a second coil spring engaging the lower end of said link and the under side of the bracket; a second vertical link connecting the truck with the other extremity of said elliptical spring; a horizontal flange upon the truck-frame; a spring engaging said flange and the lower extremity of said second link; a pair of vertical links connecting the truck with the respective extremities of the elliptical spring carried by the journal box at the non-pivoted side of the truck; horizontal flanges upon the truck frame at said non-pivoted side; and coil springs engaging said last-mentioned vertical links and the under side of said last-mentioned flanges.

4. In an oppositely-pivoted and diagonally correlated single-axle truck system, the combination, with the journal boxes of coil springs carried thereby; a saddle supported by said coil springs; an elliptical spring carried by said saddle; suspension members carried at the respective ends of said elliptical spring; and coil springs engaging said suspension members and intervening between them and the car truck frame, said springs being arranged in the described series relation, substantially as set forth.

In testimony whereof, I have hereunto signed my name at Philadelphia, Pennsylvania, this fourth day of May 1915.

WILLIAM H. STEVENSON.

Witnesses:
 JAMES H. BELL,
 E. L. FULLERTON.

Copies of this patent may be obtained for five cents each, by addressing the "Commissioner of Patents, Washington, D. C."